United States Patent [19]

Matsubara et al.

[11] Patent Number: 4,845,006

[45] Date of Patent: Jul. 4, 1989

[54] TONER AND PROCESS FOR DEVELOPING ELECTROSTATIC LATENT IMAGES

[75] Inventors: Akitoshi Matsubara, Hachioji; Kiyoshi Tamaki, Hino, both of Japan

[73] Assignee: Konishiroku Photo Industry Co., Ltd., Tokyo, Japan

[21] Appl. No.: 231,610

[22] Filed: Aug. 11, 1988

Related U.S. Application Data

[63] Continuation of Ser. No. 51,208, May 18, 1987, abandoned, which is a continuation of Ser. No. 913,640, Sep. 30, 1986, abandoned, which is a continuation of Ser. No. 833,534, Feb. 12, 1986, abandoned, which is a continuation of Ser. No. 528,844, Sep. 2, 1983, abandoned.

[30] Foreign Application Priority Data

Sep. 9, 1982 [JP] Japan ................ 57-155822

[51] Int. Cl.$^4$ ............................ G03G 13/20
[52] U.S. Cl. ..................... 430/99; 430/109
[58] Field of Search ................... 430/99, 109

[56] References Cited

U.S. PATENT DOCUMENTS

| Re. 31,072 | 11/1982 | Jadwin ................... 430/99 |
| 2,758,939 | 8/1956 | Sugarman ................ 430/55 |
| 2,843,556 | 7/1958 | Moorman ................ 525/40 |
| 3,681,106 | 8/1972 | Burns .................. 430/107 X |
| 3,764,538 | 10/1973 | Shelffo ............... 430/904 X |
| 3,836,606 | 9/1974 | Baum .................. 525/48 X |
| 3,880,656 | 4/1975 | Nagashima et al. ........ 430/107 |
| 4,082,681 | 4/1978 | Takayama et al. ...... 430/110 X |
| 4,139,483 | 2/1979 | Williams et al. ......... 430/110 |

FOREIGN PATENT DOCUMENTS

| 60339 | 4/1982 | Japan . |
| 171345 | 10/1982 | Japan ................... 430/108 |

*Primary Examiner*—J. David Welsh
*Attorney, Agent, or Firm*—Finnegan, Henderson, Farabow, Garrett & Dunner

[57] ABSTRACT

A toner for developing electrostatic latent images is disclosed. This toner comprises as a binder a graft-polymer prepared by graft-polymerizing 99.5 to 92 parts by weight of a vinyl monomer to 0.5 to 8 parts by weight of an unsaturated polyester formed by condensing a polyvalent alcohol with a polybasic acid containing 5 to 90 mol % of unsaturated disbasic acid.

4 Claims, No Drawings

TONER AND PROCESS FOR DEVELOPING ELECTROSTATIC LATENT IMAGES

This application is a continuation of application Ser. No. 051,208, filed May 18, 1987, now abandoned, which was a continuation of application Ser. No. 913,640, filed Sept. 30, 1986, now abandoned, which was a continuation of application Ser. No. 833,534, filed Feb. 12, 1986, now abandoned, which was a continuation of application Ser. No. 528,844, filed Sept. 2, 1983, now abandoned.

BACKGROUND OF THE INVENTION

1. Field of the Invention:

The present invention relates to a toner for developing electrostatic latent images formed in electrophotographic process, electrostatic printing process, electrostatic recording process and the like.

2. Description of the Prior Art:

Electrostatic latent images are developed by toners comprising a binder and a coloring agent to form a toner image, which is fixed either immediately or after being transferred onto a printing sheet. Among the several methods currently used to fix the toner image, contact type heat fixing methods such as heat roller type heat fixing is preferred to non-contact type heat fixing methods such as heat plate type fixing because of high thermal efficiency and the capability of high-speed fixing. In contact type heat fixing, the toner must be made soft enough by the heated rollers to be fixed permanently, and "an offsetting phenomenona" wherein part of the toner adheres to the surface of the heated rollers must be prevented.

Japanese Patent Application (OPI) No. 134652/75 (the symbol OPI as used herein means an unexamined published Japanese patent application) proposes to meet these requirements by using a toner the binder component of which is a resin made of a mixture of low-molecular and high-molecular weight polymers. Because of the presence of the high-molecular weight polymer, this toner is effective in preventing offsetting, but it has a relatively high softening point and requires considerably high temperatures to effect the desired fixing. This causes various problems in practice, such as increased energy consumption, prolonged warming up of the rollers, and the need for using rollers having high heat resistance and durability. If the proportion of the low-molecular weight polymer in the binder is increased in an attempt to reduce the softening point of the toner, its ability to prevent offsetting is reduced, and in addition, its glass transition point is also decreased, thus increasing the chance of aggregation of the toner particles during storage or within the developer housing.

Japanese Patent Publication No. 23354/76 proposes preventing a offsetting by using a crosslinked resin as a toner binder. But if the crosslinking density of the resin is increased to the level necessary for preventing the offsetting, the fixing temperature is increased and the same problems arise as in the case of the toner of Japanese Patent Application (OPI) No. 134652/75. As a further disadvantage, a resin with a three-dimensional network is ground only with difficulty into particles for incorporation in the toner.

Both the high-molecular weight polymer of Japanese Patent Application (OPI) No. 134652/75 and the crosslinked resin of Japanese Patent Publication No. 23354/76 are very hard, so with a toner using them as the binder component, the heated rollers deteriorate with fatigue to such an extent that offsetting easily occurs. To prevent this problem, a mold releasing lubricant such as silicone oil may be supplied to the surface of the rollers, but the oil emits a malodor when heated, or fouls the interior of the fixing apparatus. Furthermore, the oil supplying device complicates the overall construction of the fixing apparatus.

SUMMARY OF THE INVENTION

On object of the present invention is to provide a toner for developing electrostatic latent images that has high fixability and anti-offsetting properties and which hence can be advantageously used with fixing by heated rollers.

Another object of the present invention is to provide a toner for developing electrostatic latent images that has high resistance to aggregation.

These objects can be achieved by a toner for developing electrostatic latent images which comprises as a binder a graftpolymer prepared by graft-polymerizing 99.8 to 90 parts by weight of a vinyl monomer to 0.2 to 10 parts by weight of an unsaturated polyester prepared by condensing a polyvalent alcohol with a polybasic acid containing 5 to 90 mol % of unsaturated dibasic acid.

DETAILED DESCRIPTION OF THE PREFERRED EMBODIMENTS

The toner for developing electrostatic latent images according to the present invention is produced by the following procedure: a mixture of 5 to 90 mol % of an unsaturated dibasic acid having unsaturated carbon-carbon double bonds with another polybasic acid such as a saturated dibasic acid is condensed with a corresponding amount of polyvalent alcohol to form an unsaturated polyester; 99.5 to 92 parts by weight of a vinyl polymer is graft-polymerized to 0.5 to 8 parts by weight of this unsaturated polyester; the resulting graftpolymer is ground into fine particles, and a coloring agent and other necessary additives are dispersed in these toner particles to form a toner.

Using such graftpolymer as the binder component, the toner of the present invention has the following advantages, as will be illustrated in the examples that follow later in this specification. The graftpolymer contains at least 90 parts by weight of the vinyl monomer base component, so its softening point is significantly lower than that of resins having the same molecular weight. Because of this low softening point of the binder, the toner of the present invention melts at low temperatures and is fluidized sufficiently to penetrate deep into paper which is typically used as a printing sheet. This great "anchor effect" reduces the possibility of the toner separating from the paper once it is fixed thereto. Furthermore, the high molecular weight of the binder increases the toner strength and eliminates the chance of a blurred toner image or its adhesion to fingers due to abrasion that may occur after the fixing. The toner has high releasability in molten state, so it will not stick to the heated rollers and thus prevents the occurrence of offsetting. As a further advantage, the graftpolymer has a relatively high elasticity by the nature of its molecular chain, and, therefore, the toner of the present invention will not part from the printing sheet even if it is bent or otherwise deformed after the fixing operation.

In short, the toner of the present invention exhibits good fixability at low temperatures and is adequately protected against offsetting. Furthermore, the toner needs no low-molecular weight component in the binder, so it is strong and can be prepared in particles of the desired size without forming excessively fine particles that will scatter and foul the fixing apparatus. In other words, the toner can be produced in high yield. As a further advantage, the toner presents a visible image without fog.

The toner of the present invention has the following additional advantages in regard to the manufacture of the binder component. The unsaturated polyester has high reactivity for radical polymerization and enables efficient graft-polymerization with the vinyl monomer. The backbone unsaturated polyester is the condensation product of polyvalent alcohols and a mixture of polybasic acids containing unsaturated dibasic acids, so by changing the type and proportion of the unsaturated dibasic acids, polyesters having different molecular weights, and densities and sites of unsaturated groups can be prepared. Therefore, a binder having the desired characteristics can be prepared by selecting the unsaturated polyester and polyvalent alcohol, as well as by controlling the molecular weight of the graftpolymer through selection of the proper reaction conditions. All these factors contribute to providing a toner with preferred characteristics.

The mixture of polybasic acids which is one of the materials for preparing the unsaturated polyester from which the graftpolymer is produced contains 5 to 90 mol %, preferably 20–80 mol %, of an unsaturated dibasic acid having unsaturated double bonds that provide radicals for initiating graft-polymerization of the vinyl monomer. If the content of the unsaturated dibasic acid is less than 5 mol %, the resulting unsaturated polyester has an insufficient number of radicals to permit the graft-polymerization with the desired amount of the vinyl monomer. The graftpolymer produced in this case has such a low molecular weight that a toner using said polymer as a binder is low in resistance to abrasion and anti-offsetting properties. On the other hand, if the content of the unsaturated dibasic acid exceeds 90 mol %, a graftpolymer having a very high molecular weight results and since this polymer has a high softening point, a toner incorporating it as a binder is low in fixability.

The unsaturated polyester preferably has a number average molecular weight Mn of 1,000 to 20,000, more preferably, 5,000 to 10,000. The weight average molecular weight Mw of said polyester preferably ranges from 3,000 to 30,000, more preferably from 5,000 to 20,000. The ratio of Mw/Mn is preferably less than 5.0. If Mn or Mw is too small, the resulting graftpolymer unavoidably has a low molecular weight, and a toner using this polymer as a binder is low in resistance to abrasion and anti-offsetting properties. If Mn or Mw is too large, the resulting graftpolymer has an excessively high molecular weight and a toner using it as a binder requires high fixing temperatures.

The softening point of the unsaturated polyester is preferably between 80° and 140° C., more preferably between 100° and 130° C. The glass transition point of the polyester is preferably between 40° and 90° C., more preferably between 50 and 80° C. If a polyester having a softening point of less than 80° C or a glass transition point of less than 40° C. is used as a binder, the resulting toner particles are prone to aggregate. On the other hand, if the softening point exceeds 140° C. or if the glass transition point is more than 90° C., a toner which is too hard to be fixed adequately is obtained.

The unsaturated polyester described above is prepared by condensing a polyvalent alcohol with a mixture of an unsaturated dibasic acid and another polybasic acid, preferably a saturated polybasic acid. Advantageous examples of the unsaturated dibasic acid include maleic acid, maleic anhydride, fumaric acid, citraconic acid and itaconic acid, and these acids may be used either independently or in combination. Suitable examples of the saturated polybasic acid include saturated dibasic acids such as tetrachlorophthalic anhydride, the acid, tetrabromophthalic anhydride, phthalic anhydride, isophthalic acid, terephthalic acid, endomethylene tetrahydrophthalic anhydride, tetrahydrophthalic anhydride, hexahydrophthalic anhydride, succinic acid, adipic acid, azelaic acid, sebacic acid, and other saturated polybasic acids such as trimellitic acid, trimellitic anhydride, pyromellitic acid, and pyromellitic anhydride. These saturated polybasic acids may be used either independently or in combination.

Suitable polyvalent alcohols include glycols such as ethylene glycol, propylene glycol, 1,4-butanediol, 1,3-butanediol, diethylene glycol, dipropylene glycol, triethylene glycol, 1,5-pentanediol, 1,6-pentanediol, neopentyl glycol, hydrogenated bisphenol A, polyoxyethylene bisphenol A and polyoxypropylene bisphenol A, as well as glycerin. These polyvalent alcohols may be used either alone or in combination.

In preparing the unsaturated polyester, a molecular weight control agent such as benzoic acid, or a reaction catalyst or accelerator comprising an organometallic compound may also be used. The polyester may be prepared by the conventional method. The reaction is performed in an inert gas atmosphere at a temperature, say, ca. 200° C., and the water formed during the reaction is removed by a condenser under at atmospheric or reduced pressure. The progress of the reaction is monitored by sequential measurement of the acid value of the reaction product, and the reaction is completed when the desired acid value is reached.

After preparing the unsaturated polyester in the manner described above, a vinyl monomer is graft-polymerized onto the polyester to form the graftpolymer for use as a binder in the toner of the present invention. The proportion of the unsaturated polyester to the vinyl monomer ranges from 0.5-8:99.5-5-92 by weight.

Specific examples of the vinyl monomer include aromatic vinyl monomers such as styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene; acrylic acid esters such as methyl acrylate, ethyl acrylate, n-butyl acrylate, isobutyl acrylate, propyl acrylate, n-octyl acrylate, doecyl acrylate, lauryl acrylate, 2-ethylhexyl acrylate, stearyl acrylate, 2-chloroethyl acrylate, phenyl acrylate and methyl α-chloroacrylate; methacrylic acid esters such as methyl methacrylate, ethyl methacrylate, propyl methacrylate, n-butyl methacrylate, isobutyl methacrylate, n-octyl methacrylate, dodecyl methacrylate, lauryl methacrylate, 2-ethylhexyl methacrylate, stearyl methacrylate, phenyl methacrylate, dimethylaminoethyl methacrylate and diethylaminoethyl methacrylate; vinyl halides such as vinyl chloride, vinylidene chloride, vinyl bromide and vinyl fluoride; vinyl esters such as vinyl acetate, vinyl propionate, vinyl benzoate and vinyl butyrate.

The vinyl monomers listed above may be used independently, but preferably 60 to 90 wt % of aromatic vinyl monomers, particularly, styrene monomers, are combined with 40 to 10 wt % of acrylic acid esters and/or methacrylic acid esters. In this case, a graftpolymer suitable for preparing a toner having improved properties with respect to softening point, impact resistance, anti-offsetting and anti-aggregation can be obtained. If less than 60 wt % of the styrene monomer is used, the resulting graftpolymer softens so easily at low temperatures that toner particles incorporating this polymer are highly likely to aggregate. If the content of the styrene monomer exceeds 90 wt %, a hard graftpolymer results and because of its high softening point, it provides a toner having low fixability.

The vinyl monomer can be graft-polymerized onto the unsaturated polyester by any conventional method such as bulk polymerization, solution polymerization, suspension polymerization or emulsion polymerization. The suspension polymerization method is preferred. This method uses as a reaction medium 60 to 90 parts by weight of water containing 0.1 to 5 wt % of a dispersion stabilizer; to this medium, 40 to 10 parts by weight of a monomer solution prepared by dissolving the unsaturated polyester, a polymerization catalyst, a molecular weight control agent, etc. in the vinyl monomer is added under stirring, and the reaction proceeds with the monomers dispersed in the medium in the form of fine particles. The reaction temperature ranges from 50° to 120° C. After completion of the reaction, the dispersion stabilizer is removed from the solid reaction product by washing with water and filtration.

Suitable polymerization catalysts include peroxide polymerization initiators such as benzoyl peroxide and lauroyl peroxide, as well as azopolymerization initiators such as azobisisobutyronitrile. These polymerization initiators are used in an amount of 0.1 to 10.0 wt % of the monomers. Suitable molecular weight control agents are, for example, dodecyl mercaptan and butyl mercaptan, and they are used in an amount of 0 to 10 wt % of the monomers.

A crosslinking agent may be added to the reaction system in order to provide a graftpolymer with a three-dimensional network. A suitable crosslinking agent is selected from among compounds having two or more polymerizable functional groups, and they include aromatic divinyl compounds such as divinylbenzene, divinylnaphthalene and derivatives thereof, as well as carboxylic acid esters having two or more double bonds such as ethylene glycol diacrylate, ethylene glycol dimethacrylate and trimethylolpropane triacrylate. These crosslinking agents are used in an amount of 0 to 10 wt % of the monomers.

So long as it contains the above described graftpolymer as its primary component, the binder of the toner of the present invention may contain less than 50 wt % of other resin on the basis of the amount of the binder. Examples f the other resin are polyester, polyamide, polyurethane, polyurea, epoxy resin and phenolformalin resin. These resins may be used either alone or in combination.

The graftpolymer used as the binder of the toner of the present invention preferably has a melt viscosity of $10^4$ to $10^7$ poises at 140° C. If the melt viscosity is less than $10^4$ poises, the toner is not highly releasable from the heated rollers and may easily cause offsetting. If the melt viscosity exceeds $10^7$ poises, the toner requires high fixing temperatures and exhibits a small anchor effect.

A suitable coloring agent and other additives are incorporated in the binder. Any pigment or dye can be used as the coloring agent. Suitable coloring agents include carbon black, Nigrosine dye (C.I. No. 50415 B), Aniline Blue (C.I. No. 50405), Chalcoil Blue (C.I. No. azoec Blue 3), Chrome Yellow (C.I. No. 14090), Ultramarine Blue (C.I. No. 77103), Du Pont Oil Red (C.I. No. 26105), Quinoline Yellow (C.I. No. 47005), Methylene Blue Chloride (C.I. No. 52015), Phthalocyanine Blue (C.I. No. 74160), Malachite Green Oxalate (C.I. No. 42000), Lamp Black (C.I. No. 77266), Rose Bengale (C.I. No. 45435) and mixtures thereof. These coloring agents may be incorporated in an amount of about 3 to 20 wt % of the final product toner. If magnetic particles are contained in the toner, they may be substituted for all or part of the coloring agent.

The toner of the present invention may contain a magnetic material if it is used as a one-component toner. A suitable magnetic material is such that it is strongly magnetized in the direction of a magnetic field; that it is black in color, has high dispersibility in resins and is chemically stable; and that particles finer than 1 μ can be easily produced. The most preferred magnetic material is magnetite ($Fe_3O_4$) Typical magnetic materials or magnetizable materials include metals such as cobalt, iron and nickel; alloys or mixtures of metals such as aluminum, cobalt, steel, lead, magnesium, nickel, tin, zinc, antimony, beryllium, bismuth, cadmium, calcium, manganese, selenium, titanium, tungsten and vanadium; metal compounds including metal oxides such as aluminum oxide, iron oxide, copper oxide, nickel oxide, zinc oxide, titanium oxide and magnesium oxide. These magnetic materials are contained in an amount of 40 to 70 wt % of the toner.

The toner of the present invention may further contain an anti-offsetting agent, prepolymer, charge control agent, fluidizer or a liquid resin. A suitable anti-offsetting agent is a low-molecular weight polyolefin, and those having a number average molecular weight of 500 to 10,000 and a softening point of 100° to 180° C. are preferred. The toner can be produced by any of the known methods. A typical method consists of kneading the ingredients with heated rolls or a heated extruder, cooling the mixture, grinding the cooled mass into particles, and classifying the particles into a suitable size.

The softening point of the graftpolymer according to the present invention is measured by a overhead-type flow tester, Model CFT-500, of Shimadzu Seisakusho, Ltd. using a sample of 1 cm³ (in the weight terms of the intrinsic specific gravity times 1 cm³) under the following conditions: load = 20 kg/cm², nozzle diameter = 1 mm, nozzle length = 1 mm, preheating = 80° C. ×10 min, temperature elevation rate = 6° C./min. The softening point is the temperature corresponding to h/2, wherein h is the height of an S-curve (softening and fluidizing curve) indicating the relation between temperature and the fall of the plunger of the tester.

The melt viscosity (VI) of the graftpolymer can be calculated by the following formula on the basis of the data obtained in the measurement of the softening point:

$$VI = \frac{\pi R^4 P}{8LQ} \text{ (poise)}$$

wherein
P: test pressure (dyne/cm$^2$);
L: nozzle length (cm);
R: nozzle radius (cm);

$$Q: \frac{\Delta X}{\Delta t} A \text{ (ml/sec)};$$

wherein
A: cross section area of the cylinder (cm$^2$);
$\Delta X$: cylinder stroke for measurement (cm);
$\Delta t$: time of measurement.

The glass transition point of the graftpolymer is measured with a differential scanning calorimeter, Low-Temperature DSC, of Rigaku Denki Co., Ltd. at a temperature elevation rate of 10° C./min. The specific glass transition point is the temperature corresponding to the point where an extension of the baseline below the glass transition point of the DSC thermogram in the glass transition region crosses the steepest tangent line to a convex curve as measured between the rising edge and the peak.

The number average molecular weight (Mn) and the weight average molecular weight (Mw) of the graftpolymer can be measured by various methods, which will produce different values of Mn and Mw. Therefore, in this specification, the two parameters are defined as those values which are measured by gel permeation chromatography (GPC) under the following conditions. At 40° C., a solvent (tetrahydrofuran) is passed through a gelfilled column at a rate of 1.2 ml/min while a sample in tetrahydrofuran having a concentration of 15 g/5 ml is fed in an amount of 3 mg of the reduced sample weight. The conditions for the measurement are so selected that the molecular weight of the specific sample is within the range where the logarithm of each molecular weight on a calibration curve prepared from several standard samples of monodisperse polystyrene has a linear relationship with the actual count of the molecular weight. The reliability of this measurement is confirmed by checking if standard polystyrene sample NBS 706 had Mn=13.7×10$^4$ and Mw=28.8×10$^4$ under the conditions of measurement specified above. Any type of GPC column that satisfies these requirements may be used for determining the Mn and Mw of the graftpolymer, and a typical example is TSK-GEL or GMIXH 6 by Toyo Soda Co., Ltd.

The toner of the present invention may be used with any image forming material that is capable of retaining an electrostatic latent image on its surface, and suitable examples include photoconductive materials such as selenium photoreceptor having a layer of selenium vapor-deposited on an electrically conductive support, and photoreceptors comprising an electrically conductive support carrying a polymer compound coat having zinc oxide or organic semiconductor dispersed therein, as well as dielectric recording materials having an insulating resin coat on an electrically conductive support.

An electrostatic latent image can be formed on these imageforming materials by any suitable method such as performing imagewise exposure after applying a uniform charge pattern on the surface of the image forming material by a charging device, or by directly forming a latent electrostatic image on said material by an electrostatic recording stylus or ion-stream control electrodes. The features and advantages of the present invention are hereunder described in greater detail by reference to working examples, but it should be understood that they are given here for illustrative purposes only and are by no means intended to limit the scope of the invention.

EXAMPLE 1

A four-necked flask having a capacity of 3,000 ml and equipped with a thermometer, a stirrer, a gas-introducing pipe and a reflux condenser was first charged with 1720 g (5 mol) of polyoxypropylene-2,2'-bis(4-hydroxyphenyl)propane, and then with nitrogen gas that was supplied through the gas-introducing pipe to make the atmosphere of the interior of the flask inert. Thereafter, a mixture of 622.5 g (3.75 mol) of terephthalic acid and 145 g (1.25 mol) of maleic acid was introduced into the flask while its temperature was held at 50° C. Then, polymerization was effected for 6 hours while the temperature of the system was held at 200° C. The water that formed as the reaction proceeded was removed by trapping with the condenser. Thereafter, the gas-introducing pipe and condenser were disconnected, and the flask was connected to a vacuum line having a trap. The polymerization was continued for another 6 hours at 200° C, with the resulting water being removed by trapping under vacuum. The so prepared unsaturated polyester A had a glass transition point of 68° C., a softening point of 105° C. and an acid value of 15.

Using unsaturated polyester A, a graft composition having the formulation indicated below was prepared.

| Components | Amount (parts by wt.) |
| --- | --- |
| Unsaturated polyester A | 2 |
| Styrene | 80 |
| n-Butyl acrylate | 20 |
| Benzoyl peroxide | 4 |

A four-necked flask with a stirrer, thermometer and a gas-introducing pipe was charged with 800 ml of water containing 2 wt % of calcium phosphate and 0.1 wt % of a surfactant, and the flask was then filled with nitrogen gas that was supplied through the gas-introducing pipe. After adding 212 g of the graft composition into the flask and suspending, the mixture was held at 80° C. in order to effect graft-polymerization for about 8 hours. After completion of the reaction, the system was cooled and subjected to repeated cycles of filtration and washing with water. The solid product was dried to form graftpolymer I, which had a softening point of 130° C. and a glass transition point of 64° C., as shown in Table 2.

The following ingredients were mixed with a ball mill for 6 hours.

| Ingredients | Amount (parts by wt.) |
| --- | --- |
| Graftpolymer I | 100 |
| Carbon black "Mogal L" | 10 |
| Polypropylene "Viscor 660P" | 2 |

The mixture was kneaded in a two-roll mill at 130° C. for 1 hour. After cooling, the resulting mass was first ground coarsely, then finely with a jet mill. The fine particles were classified to provide toner sample No. 1 of the present invention having an average grain size of 11 microns.

EXAMPLES 2 to 6 and COMPARATIVE EXAMPLES 1 to 5

Six samples of unsaturated polyester B to G having the formulations indicated in Table 1 were prepared according to the method of preparing sample A in Example 1. One of these unsaturated polyesters was mixed with the vinyl monomers indicated in Table 2 and the mixtures were treated as in Example 1 to prepare eleven graftpolymers II to XI. Using these graftpolymers, five toner samples, No. 2 to No. 6 of the present invention, and five comparative toner samples, No. 1 to No. 5, were produced as in Example 1.

In Table 1, the term "mol %" indicates the number of mols of the unsaturated dibasic acid in each mixture of polybasic acids. In Table 2, the term "proportion" in the column "unsaturated polyester" indicates the part by weight percentage of the unsaturated polyester in the graft composition; "$T_G$" represents the glass transition point; "$T_S$" denotes the softening point; and "melt viscosity" refers to a value at 140° C. The symbols used in the columns "polyvalent alcohol" and "vinyl monomer" denote the following:

POPP: polyoxypropylene-2,2'-bis(4,4'-hydroxyphenyl) propane;
BA : n-butyl acrylate;
BMA : n-butyl methacrylate.

Five parts by weight of each of toner samples No. 1 to No. 6 of the present invention and comparative toner samples No. 1 to No. 5 was mixed with 95 parts by weight of a carrier (iron powder) to prepare developing agents. They were tested for their fixability, anti-offsetting and anti-aggregating properties. The results are shown in Table 3.

In the fixing test, electrostatic latent images formed by conventional electrophotography were developed with the twelve developing agents and the resulting toner images were then transferred onto printing sheets. The sheets were fed through a fixing apparatus having heated rollers the surface layer of which was made of Teflon (trademark for the polytetrafluoroethylene of E.I. du Pont de Nemours & Co.) and a pressure roller the surface layer of which was made of silicone rubber, KE-1300 R.T.V. of Shinetsu Chemical Industry Co., Ltd. The feed (linear) rate was set at 150 mm/sec but the temperature of the heated rollers was varied to determine the minimum fixing temperature $T_F$.

In the offsetting test, the toner images formed as in the fixing test were transferred onto printing sheets and fixed thereto by passing through the fixing apparatus. Thereafter, blank printing sheets were fed into the fixing apparatus to observe if they were stained with the toner particles (i.e. to observe if offsetting had occurred). By varying the temperature at which the heated rollers were set, the lowest temperature To at which offsetting would occur was determined.

In the aggregation test, each of the developer samples was put in a container, which was left in a constant temperature bath (55° C.) for 24 hours to observe if any aggregation of the toner particles occurred.

The results are shown in Table 3.

TABLE 1

| Unsaturated polyester | Polybasic Acids | | *Mol % | Polyvalent alcohol | Mn | Mw | Acid value |
| | Unsaturated dibasic acid | Other polybasic acid | | | | | |
| --- | --- | --- | --- | --- | --- | --- | --- |
| A | Maleic acid (1.25) | Terephthalic acid (3.75) | 25 | POPP (5) | 4800 | 14700 | 15 |
| B | Maleic acid (1.0) | Terephthalic acid (4.0) | 20 | POPP (5) | 5400 | 18500 | 14 |
| C | Maleic acid (1.25), fumaric acid (0.75) | Terephthalic acid (3.0) | 40 | POPP (5) | 4300 | 13300 | 16 |
| D | Maleic acid (1.25), fumaric acid (1.25) | Terephthalic acid (2.5) | 50 | POPP (5) | 4100 | 12600 | 16 |
| E | Maleic acid (1.25), fumaric acid (2.75) | Terephthalic acid (1.0) | 80 | POPP (5) | 3700 | 11000 | 17 |
| F | Maleic acid (2.5), fumaric acid (2.5) | — | 100 | POPP(5) | 2220 | 6900 | 18 |
| G | Maleic acid (0.15) | Terephthalic acid (4.85) | 3 | POPP (5) | 12600 | 28900 | 11 |

$$* \frac{\text{Unsaturated dibasic acid (Mol)}}{\text{Polybasic acids (Mol)}} \times 100$$

TABLE 2

| | Graft-polymer | Unsaturated polyester | | Vinyl monomers Type and ratio (parts by weight) | $T_G$ (°C.) | $T_S$ (°C.) | Melt viscosity (poise) |
| | | Type | Proportion (wt %) | | | | |
| --- | --- | --- | --- | --- | --- | --- | --- |
| Toner sample No. | | | | | | | |
| 1 | I | A | 1.96 | Styrene (80), BA (20) | 64 | 130 | $9 \times 10^4$ |
| 2 | II | B | 3 | Styrene (80), BA (20) | 66 | 132 | $1 \times 10^5$ |
| 3 | III | D | 3 | Styrene (80), BA (20) | 68 | 138 | $6 \times 10^5$ |
| 4 | IV | E | 3 | Styrene (80), BA (20) | 70 | 143 | $8 \times 10^5$ |
| 5 | VI | C | 2 | Styrene (65), BMA (35) | 67 | 129 | $7 \times 10^4$ |
| 6 | VII | C | 8 | Styrene (65), BMA (35) | 72 | 141 | $3 \times 10^6$ |
| Comparative Sample | | | | | | | |
| 1 | VIII | F | 3 | Styrene (80), BA (20) | 71 | 153 | $2 \times 10^7$ |
| 2 | IX | G | 3 | Styrene (80), BA (20) | 63 | 125 | $4 \times 10^4$ |
| 3 | X | C | 0.1 | Styrene (65), BMA (35) | 60 | 115 | $8 \times 10^3$ |
| 4 | XI | C | 12 | Styrene (65), BMA (35) | 73 | 156 | $3 \times 10^7$ |
| 5 | V | C | 0.2 | Styrene (65), BMA (35) | 62 | 122 | $5 \times 10^4$ |

TABLE 3

| Toner sample No. | $T_{F1}$ (°C.)* | $T_{F2}$ (°C.)** | $T_0$ (°C.) | Aggregation |
| --- | --- | --- | --- | --- |
| Samples of the present invention | | | | |
| 1 | 145 | 140 | 220 | None |
| 2 | 140 | 140 | 230 | None |
| 3 | 145 | 145 | ≧240 | None |
| 4 | 145 | 150 | ≧240 | None |
| 5 | 140 | 140 | ≧240 | None |
| 6 | 150 | 145 | ≧240 | None |
| Comparative samples | | | | |
| 1 | 190 | 180 | ≧240 | None |
| 2 | 160 | 140 | 180 | Slight |
| 3 | 160 | 145 | 160 | Yes |
| 4 | 190 | 180 | ≧240 | None |
| 5 | 140 | 135 | 200 | Slight |

*The symbol "$T_{F1}$" means the lowest temperature at which the copy image remained intact even when it was abraded by paper of the same type as that of the printing sheet onto which said image was fixed.

**"$T_{F2}$" denotes the lowest temperature at which the toner particles in the image area covered with an adhesive tape were not dislodged even when said tape was subsequently peeled off the image area.

As Table 3 shows, the toner samples of the present invention were better than the comparative samples with respect to fixability, as well as anti-offsetting and anti-aggregation properties.

What is claimed is:

1. A process for forming images which comprises developing latent electrostatic images and thermally fixing the resulting images with use of a fixing apparatus having a heat-roller, wherein said latent electrostatic images are developed with a toner comprising a binder, a polyolefin and a coloring agent, said binder consisting essentially of 99.5 to 92 parts by weight of a vinyl monomer graft-polymerized to 0.5 to 8 parts by weight of an unsaturated polyester, and said unsaturated polyester being a condensation product of a polybasic acid containing 20 to 80 mol percent of an unsaturated dibasic acid and a corresponding amount of a polyvalent alcohol, said binder having a softening point of 120° to 160° C., a glass transition point of 50° to 80° C. and a melt viscosity of $10^4$ to $10^7$ poises at a temperature of 140° C., said polyolefin having a softening point of 100° to 180° C., said unsaturated polyester having a number average molecular weight of 1,000 to 15,000 and a weight average molecular weight of 5,000 to 30,000, as measured by gel permeation chromatography, and said vinyl monomer being a mixture of 60 to 90 mol % of styrene and 40 to 10 mol % of an acrylic acid ester and/or a methacrylic acid ester.

2. A process according to claim 1, wherein said polyvalent alcohol is a polyoxyethylene bisphenol A.

3. A process according to claim 1, wherein said polybasic acid is a terephthalic acid.

4. A process according to claim 1, wherein said unsaturated dibasic acid is a maleic acid or a fumaric acid.

* * * * *